United States Patent [19]

Chapman

[11] 4,205,661
[45] Jun. 3, 1980

[54] SOLAR BOILER

[76] Inventor: Marcus R. Chapman, 711 Marshall St., Plaquemine, La. 70764

[21] Appl. No.: 942,057

[22] Filed: Sep. 13, 1978

[51] Int. Cl.² .................... F24J 3/02; B24F 13/00; G01N 21/00
[52] U.S. Cl. .................... 126/425; 126/440; 126/447; 126/448; 248/323; 250/491
[58] Field of Search ............ 126/270, 271, 425, 440, 126/447, 448; 237/1 A; 248/323; 250/491

[56] References Cited
U.S. PATENT DOCUMENTS

| | | | |
|---|---|---|---|
| 4,066,062 | 1/1978 | Houston | 126/440 |
| 4,068,653 | 1/1978 | Bourdon et al. | 126/440 |
| 4,069,812 | 1/1978 | O'Neill | 126/440 |

Primary Examiner—James C. Yeung
Assistant Examiner—Daniel J. O'Connor
Attorney, Agent, or Firm—Arnold, White & Durkee

[57] ABSTRACT

A solar boiler having a heat receiver element which substantially tracts the path of the sun for utilizing solar energy to heat a fluid passing through the boiler. A lens system is mounted on the upper portion of the heat receiver and concentrates the rays of the sun directly onto the upper surface of the receiver. Also included is a means for tilting the heat receiver in response to the apparent movement of the sun along its arcuate path. In addition, a base assembly is connected to the tilting means and is adapted for rotating the heat receiver in a substantially horizontal plane such that such rotation, in combination with the tilting movement, maintains the heat receiver in proper alignment with the rays of the sun.

9 Claims, 5 Drawing Figures

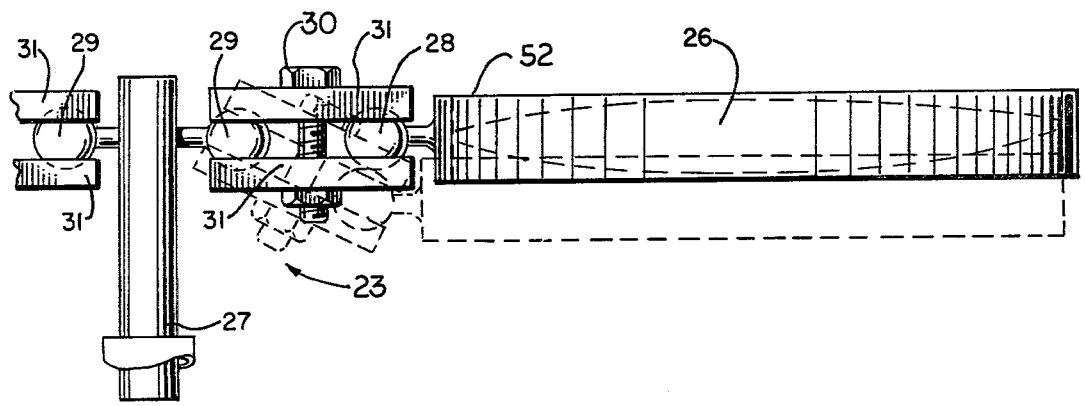
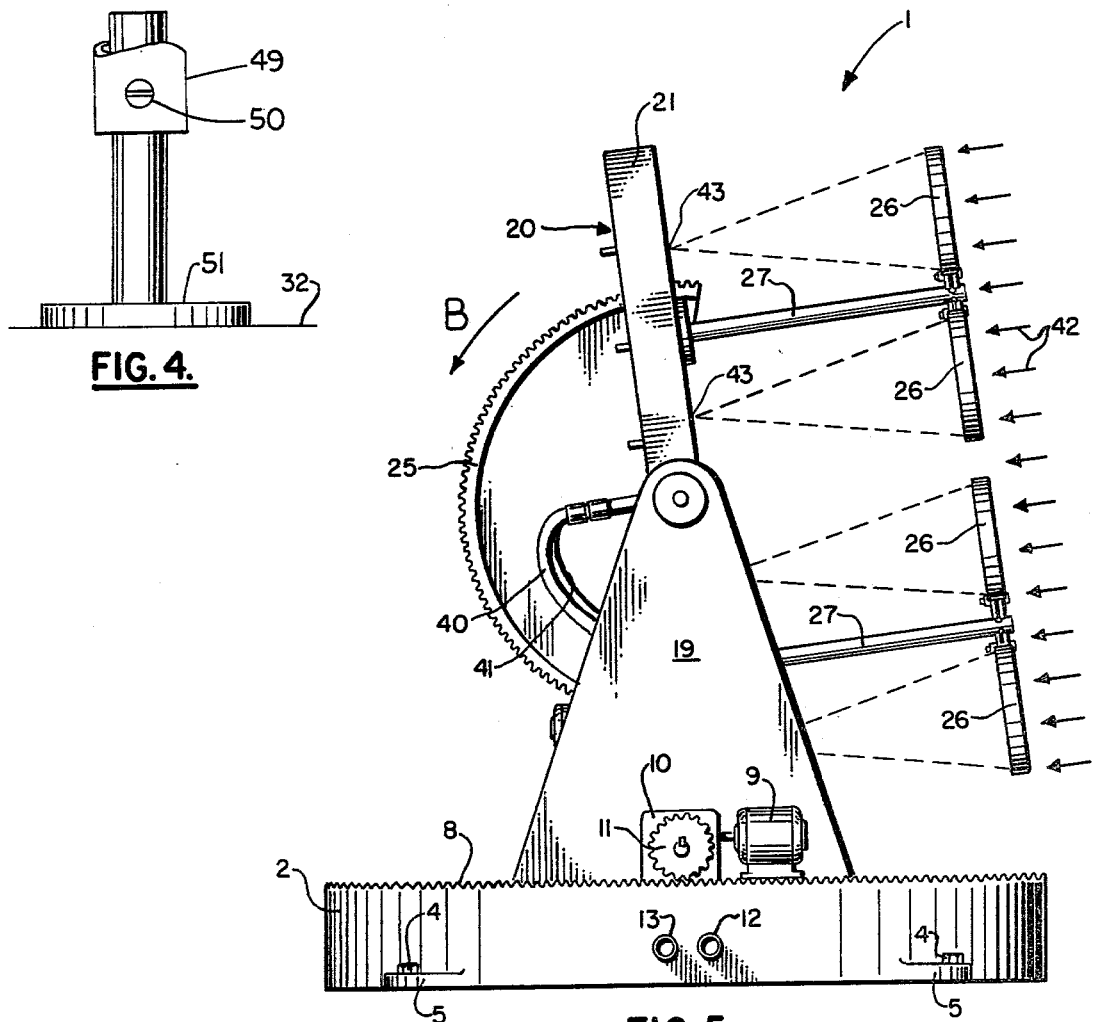
FIG. 4.
FIG. 5.

SOLAR BOILER

BACKGROUND OF THE INVENTION

1. Field of the Invention

The present invention relates generally to solar boilers, and more particularly to a solar boiler having independently operated tilting and rotating means for accurately maintaining the proper orientation of the heat receiving portion of the solar boiler with respect to the sun's rays.

2. Description of the Prior Art

Solar energy conversion units of all types are becoming extremely popular and are receiving widespread attention and acceptance. Of particular interest with respect to solar energy devices are those devices which may be efficiently operated yet simple to construct and maintain. Of particular interest with respect to the consuming public are those solar energy converting devices which may be fabricated in small units allowing use by individual consumers.

The prior art as exemplified by U.S. Pat. Nos. 260,675; 277,885; 3,070,643 and 3,985,118, is generally illustrative of various solar energy conversion devices utilizing a lens for concentrating the sun's rays. While such devices are generally acceptable for their intended purpose, they have not proven to be entirely satisfactory in that they are complex and expensive to manufacture, bulky and inconvenient to use, functional only in limited areas of the world, exhibit complicated control mechanisms, require unusual skill and knowledge to operate, and typically can only be utilized after substantial investment.

For example, U.S. Pat. No. 260,657 to Calvert discloses a method and means for concentrating the rays of the sun through a series of reflectors which are independently aligned in order to focus the sun's energy through a lens. As illustrated in Calvert, it is necessary to construct a rail system and coordinate the movement of the reflector with the apparent movement of the sun. Also, the boiler itself does not rotate in unison with the lens system.

U.S. Pat. Nos. to Toulmin, 3,070,643 and to Bard, 3,985,118, disclose the use of a lens system to concentrate the sun's energy onto a elongated chamber or heat conductive element. Again, the mechanism disclosed for maintaining each device in proper alignment with the rays of the sun involve complicated systems requiring substantial skill in order to maintain. The Toulmin device is designed to generate electricity by heating a plurality of thermoelectric elements. No mention is made of heating a fluid as in a solar boiler. The device of Bard does not provide for tilting and rotating the lens system.

As a result of the shortcomings of the prior art, typified by the above, there has developed and continues to exist a substantial need for a solar boiler which is compact, safe, economical to operate, inexpensive, and provides efficient utilization of available solar energy. Despite this need, and the efforts of many individuals and companies to develop such devices, a safe and efficient solar boiler has heretofore been unavailable.

SUMMARY OF THE INVENTION

A feature of the solar boiler pertains to a novel apparatus for utilizing solar energy to heat a fluid. Another feature of the present invention resides in the efficient operation and simple maintenance and construction of a solar boiler which utilizes a single lens system for concentrating the available solar energy onto a heat receiving element.

Still another feature of the present invention involves a solar boiler which comprises independent means for tilting and rotating the heat receiving element in order to efficiently absorb the available solar energy.

A further feature of the present invention is a lens system for accurately concentrating the rays of the sun on a heat receiver with substantial adjustment means which allow efficient operation of the solar boiler.

The present invention is advantageous over the prior art in that the same is economical to construct, is safe for use by persons without advanced technical training, effectively achieves the combined advantages of providing usable energy from solar energy without sophisticated tracking mechanism.

The present invention is summarized in that a solar boiler includes a base assembly having a rotatable central portion therein, a support structure mounted on the central portion, a heat receiver through which the fluid to be heated may pass. This heat receiver is axially mounted on the support structure. Also mounted on the support structure is a tilt assembly for tilting the heat receiver with respect to the base assembly and support structure. Mounted on the upper surface of the heat receiver is a lens system adapted for focusing the rays of the sun onto the heat receiver.

Other features and advantages of the present invention will become apparent from the following description of the preferred embodiment when taken in conjunction with the accompanying drawings.

BRIEF DESCRIPTION OF THE DRAWINGS

FIG. 4 is a partial elevation view of the lens assembly included in the present invention;

FIG. 5 is an elevation view similar to FIG. 1 showing the heat receiver in a tilted position.

DESCRIPTION OF A PREFERRED EMBODIMENT

As will be more fully appreciated as the individual elements of the present invention are explained in more detail, the present invention is adapted for concentrating the rays of the sun onto a heat receiver element which transfers this heat directly to a fluid which is circulated through the boiler. Various components of the present invention are utilized to maintain the heat receiver element in proper orientation with respect to the solar rays without extensive or elaborate controls. The present invention utilizes independent tilting means and rotation means in order to maintain the heat receiver element in an optimum position in the horizontal as well as the vertical plane.

Figure 1:
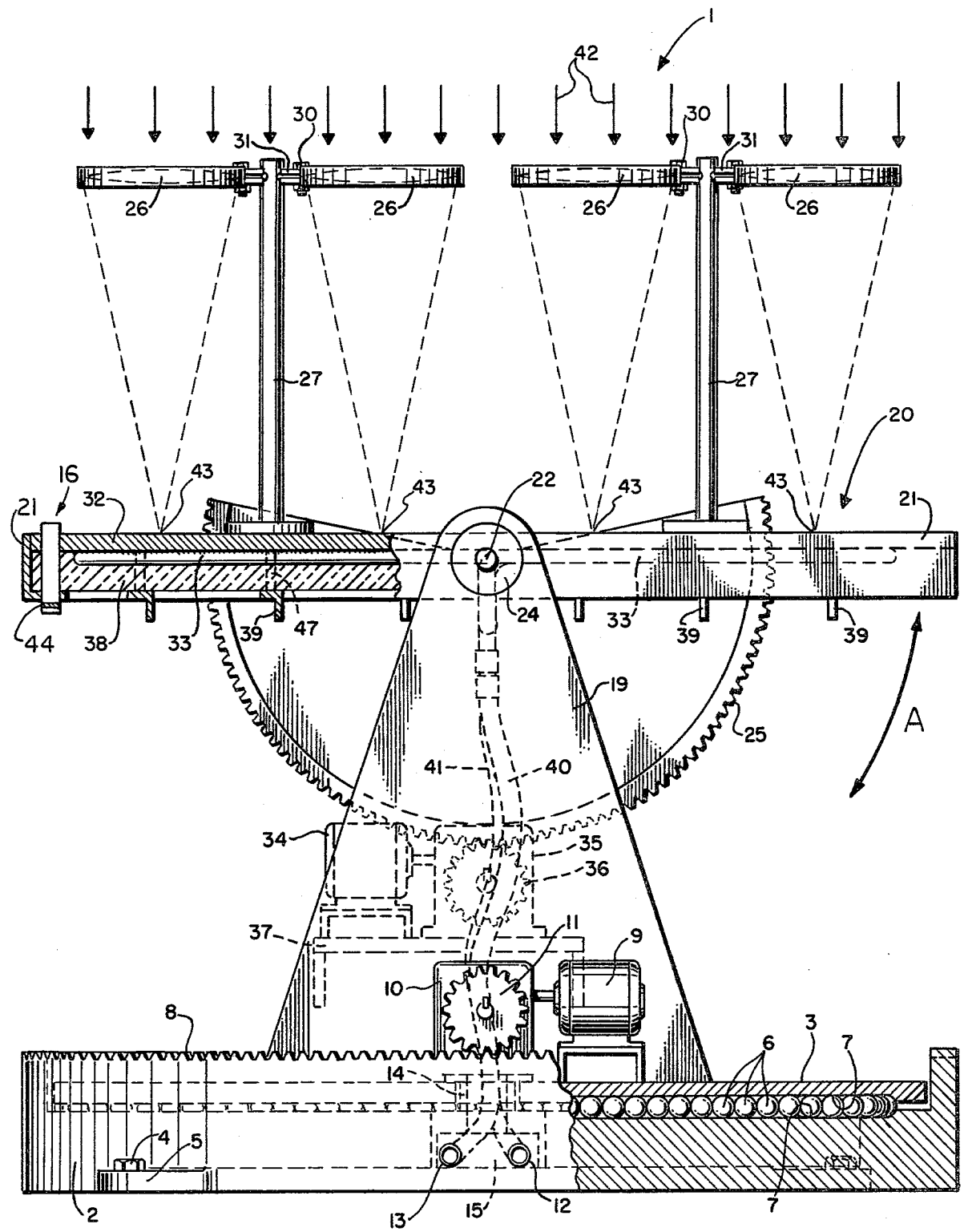
FIG. 1 is an elevation view of a preferred embodiment of a solar boiler according to the present invention.

Turning first to FIG. 1, there is shown the base assembly of the present invention which includes a generally circular, ring-shaped foundation member 2 with an annular recess within which is located a central foundation hub 14. (See FIG. 3) As seen in FIG. 1, foundation member 2 has a generally U-shaped cross section with its lowermost portion forming a substantially planar surface. Foundation member 2 may held in position by fastening means attached to foundation member 2. An example of such fastening means attached to the outer periphery of the member 2 is illustrated in FIG. 1 whereby foundation bolt 4 passes through foundation flange 5 to effectively secure the foundation member in position on a stationary platform or other such support.

Referring again to FIG. 1, a central portion or plate member 3 is disclosed positioned within the annular recess of foundation member 2. Central plate 3 is adapted for rotation about foundation hub 14. One means for allowing such rotational movement of plate 3 may be through the use of ball bearings 6 mounted within at least one annular bearing groove 7. Plate 3 is positioned within member 2 and is allowed to rotate about foundation hub 14 by resting on bearings 6. Although a singular bearing groove with appropriate ball bearings is disclosed in the present embodiment, it can be appreciated that a plurality of such matching bearing grooves may be provided within central plate 3 and foundation member 2. A plurality of such bearing grooves may be needed for support due to the load placed upon the upper surface of central portion 3.

Figure 2:
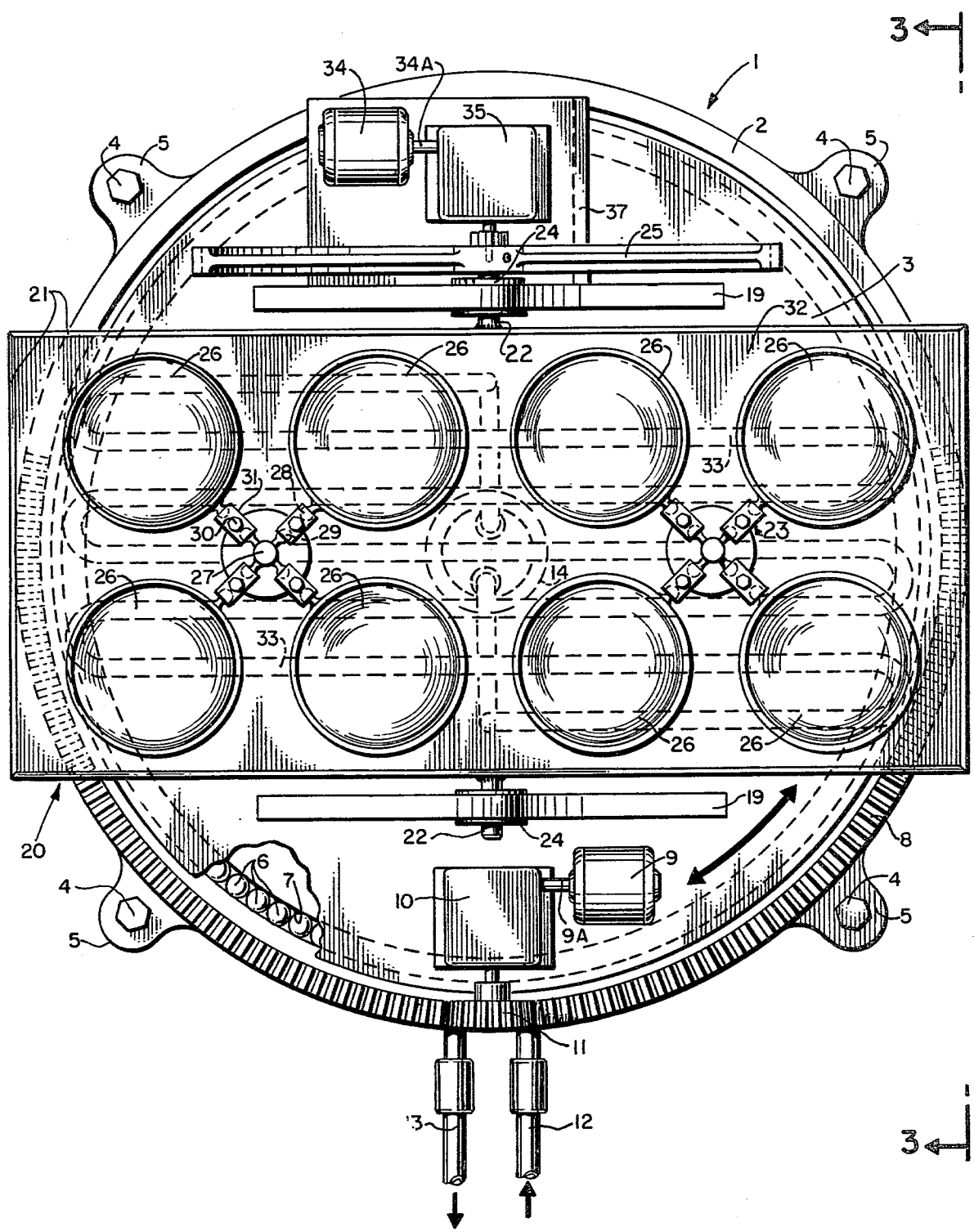
FIG. 2 is a plan view of the device of FIG. 1.

Turning to FIGS. 1 and 2, it is seen that the upper peripheral surface of foundation member 2 has been formed into a gear surface 8 having teeth extending upwardly from member 2. Such teeth enable a matching gear spur 11 to engage such teeth when appropriately positioned. The use of such a gear surface 8 in rotating central portion 3 will be explained in further detail subsequently.

Also seen in FIG. 1 are fluid conduits or tubes 12, 13 adapted for communicating the fluid to be heated to and from the solar boiler 1. Inlet conduit 12 provides a port on one surface of the base assembly 2 and is adapted for connection with conventional fluid conducting conduit thereby enabling the fluid to be heated to be introduced into the boiler as will be discussed in detail. Fluid outlet conduit 13 is positioned adjacent conduit 12 and is also adapted for connection with conventional fluid contact means to transport the fluid after it has passed through the boiler and absorbed sufficient amounts of solar energy.

Figure 3:
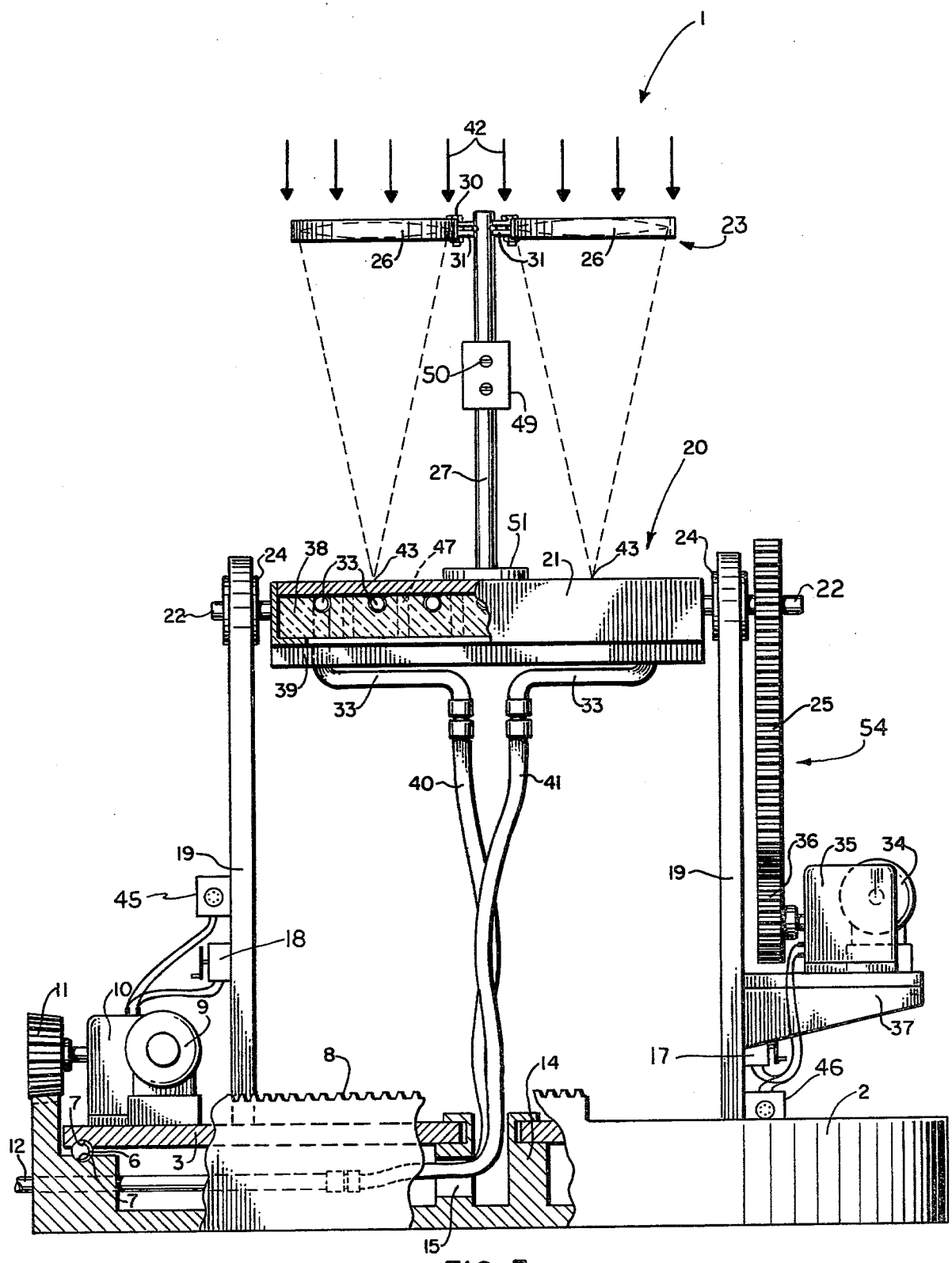
FIG. 3 is an elevation view of the device taken along line 3—3 of FIG. 2.

As more clearly seen in FIG. 3, fluid conduits 12, 13 enter the foundation hub 14 through hub supply orifice 15. This positioning of the fluid conducting conduits or input and output tubes 12 and 13 is necessary since the central plate 3 of the foundation assembly 2 rotates about the foundation hub 14 during normal operation of the boiler.

Rotational movement of the boiler is accomplished through the use of a rotary drive assembly associated with the central plate 3 for rotating the plate with respect to the foundation member 2. This rotary drive assembly may consist of a means for providing rotary power, as for example an electric motor 9, a first reduction unit 10 connected by a shaft to foundation gear 11. As best shown in FIG. 3, motor 9 and reduction unit 10 may be mounted to the upper surface of the peripheral edge of central portion 3. As can be easily understood, electrical energy is supplied to the motor 9 through a conventional power source with its necessary electrical conductors passing through the foundation hub 14 (not shown). The motor 9 is connected directly to the first reduction unit 10, a standard gear reduction unit. Unit 10 causes gear 11 to rotate at a predetermined rate which is necessary to properly maintain the heat receiver portion 20 of the solar boiler in proper alignment with the rays of the sun during its apparent travel.

Referring to FIG. 1 again, foundation gear 11 is positioned adjacent gear surface 8 such that the teeth of gear 11 engage the teeth of the foundation gear surface 8. Therefore, as foundation gear 11 is rotated at a predetermined rate by motor 9, its teeth engage the teeth of surface 8 causing central portion 3 upon which gear 11 is mounted to rotate with respect to the base assembly 2.

In FIG. 3 a rotary timer 45 for controlling the first reduction unit 10 may be mounted on vertical support 19. As can be appreciated, the position or location of timer 45 may be any convenient location which rotates in unison with first reduction unit 10. In the alternative, timer 45 may be positioned remote from boiler 1 with the conductors attached to unit 10 passing through hub 14 similar to conduits 12, 13.

First reduction unit 10 may be any standard gear unit such as those manufactured by Borg Warner, Inc. under the name "MORSE speed reducers". The timer 45 may be electrically or pneumatically operated such as those manufactured by Control Products Division of Amerace Corporation, under the name "HEASTAT". Also, it will be appreciated that depending upon the size and weight of the solar boiler, it may be necessary to install bearings at foundation hub 14 or at various locations between hub 14 and the outer periphery of central plate 3. These bearings may be conventional items such as those manufactured by the Torrington Company.

The rotation of central plate 3 as a result of foundation gear 11 engaging foundation gear surface 8 is necessary since the apparent path of the sun is an arc with respect to a boiler stationary on the earth's surface. Therefore, to maintain the heat receiver 20 in the proper positional relationship with respect to the sun's rays, at least a portion of the boiler must rotate about a vertical axis passing through the foundation hub 14 as well as tilt with respect to a horizontal axis passing through the transverse shaft 22 (See FIG. 1). Such tilting will be explained in more detail subsequently.

Turning once again to FIGS. 1 and 3, vertical support member 19 is shown attached to the upper surface of central plate 3. Support members 19 are illustrated as having a triangular shape, however, other types of support structures may be utilized for mounting the heat receiver 20 in spaced relationship with the central plate 3.

As best shown in FIG. 3, transverse shaft 22 is attached to heat receiver 20 with at least one of the ends of shaft 22 extends outwardly from one edge surface of the heat receiver 20. As illustrated in FIG. 3, the present embodiment discloses a transverse shaft 22 extending through heat receiver 20 with each of its ends extending outwardly from the edge surfaces of the heat receiver 20. Each end of transverse shaft 22 is axially mounted within shaft bearings 24, bearings 24 being fixed to support 19. Since each end of transverse shaft 22 is axially mounted within bearings 24, rotational movement of shaft 22 is allowed within bearing 24. Since heat receiver 20 is affixed to the central portion of shaft 22, heat receiver 20 is also rotated about the longitudinal axis of shaft 22 as shaft 22 is rotated.

Such rotation or tilting is accomplished through an angular orientation means consisting of tilt gear segment 25, tilt power means 34, second reduction unit 35 and tilt power gear 36. The operation of this angular orientation means will be subsequently described in more detail.

As shown in FIG. 1, heat receiver 20 consists of a heat conductive mass 32 which forms the upper or top surface of heat receiver 20. In the particular device illustrated, heat conductive mass 32 consists of a metallic plate capable of easily conducting heat from its upper surface. For example, but without limitation, the mass 32 may take the form of a flat copper plate.

In order to transfer heat to the working fluid, a fluid passage is disposed in heat conducting relationship to plate 32, such passage may be connected through flexible conduits 40 and 41 to the input and output conduits 12 and 13. In the embodiment disclosed in FIGS. 1 and 3, this fluid passage takes the form of a continuous conduit 33 attached directly to the bottom surface of plate 32 with the conduit 33 forming a series of coils running longitudinally of the heat receiver (See FIG. 2).

As can be appreciated, because the heating plate 32 may be constructed of a highly conductive metal such as copper, the entire plate which is exposed to the solar heat focused by lens assembly 23 becomes quite hot. Since the fluid to be heated is pumped through inlet conduit 12 and tube 41 into the fluid conduits 33, the fluid is heated as a result of the heat conductive coils contacting plate 32. As such fluid passes through the various coils of the fluid passage, the fluid is heated to a desired temperature and then passes through flexible outlet tube 42 to outlet conduit 13.

For example, but without limitation, the working fluid may take the form of water which enters the solar boiler at a sufficiently slow rate as to allow the water to be heated to such an extent as to form steam which is then passed from the solar boiler. This steam is then available to do useful work such as heating or electric generating. However, if the rate of water entering the solar boiler is substantially increased, such water will not be converted into steam, but rather simply heated below its boiling point. As a result, hot water rather than steam would be produced which can be used for domestic heating or other uses.

Referring back to FIGS. 1 and 3, the heat receiver 20 may also include insulation material 38 positioned adjacent the lower surface of heat plate 32 and adjacent or surrounding fluid passage coils 33. Such insulation material may be desirable in order to prevent heat loss from the underside of heating plate 32 and the outer surfaces of the fluid passages 33. If such insulating material is utilized, it is recommended that insulation supports 39 be utilized to maintain insulation material 38 in position and provide additional strength to the heat receiver 20.

Now turning to FIG. 4, the lens assembly 23 which may be mounted on the upper surface of the heat conductive mass 32 is illustrated. As shown, a plurality of lens assemblies are mounted on the heat receiver 20. Such lens assemblies consist of a vertical lens support 27 oriented substantially normal to the heat plate 32 and held in position by support flange 51. Support flange 51 may be attached directly to heat plate 32 by means of welding, bolts or other suitable fastening means.

It can be seen in FIG. 4 that the vertical lens support 27 may be constructed as to be adjustable in length through the use of a support collar 49 held in position by set screws 50. In order to adjust the distance between the surface of the heat plate 32 and lens 26, one may release one or both set screws 50 and position the apparatus where desired. After proper positioning is accomplished the set screws 50 are replaced in order to maintain the lens in its desired location.

At the uppermost end of lens support 27 is located a plurality of support adjustment balls 29. Each adjustment ball 29 is partially enclosed by upper and lower clamp plates 31 held in position by adjustment bolt 30. Located also between clamp plates 31 are also lens adjustment balls 28. Attached to each lens adjustment ball 28 is a lens frame 52. Mounted within frame 52 may be a biconvex lens 26, however, it can be appreciated that any type of lens capable of concentrating the sun's rays on heat plate 32 is acceptable. Lens 26 may be of circular configuration as shown in the embodiment disclosured in FIGS. 2 and 4, having appropriate refractory qualities as to concentrate the rays of the sun 42 onto a focal point 43 (FIG. 3) on the upper surface of heat conducting means or plate 32.

Referring once again to FIG. 4, it can be seen that by utilizing adjustment balls 28 and 29, the vertical distance between frame 52 and the upper surface of plate 32 may be adjusted to a limited extent to properly position the focal point 43 with respect to the surface of plate 32. Such an adjustment when combined with the adjustable characteristics facilitated by collar 49 located on vertical support 27, enables each lens to be independently adjusted in order to facilitate maximum concentration of rays 42 upon the upper surface of heating plate 32.

Referring back to FIGS. 1 and 3, there is disclosed a means for angularly orienting or tilting heat receiver 20 in response to the apparent movement of the sun along its arcuate path. Such movement of the sun necessitates a continual tilting of heat receiver 20 with respect to base assembly 2. Such tilting in the direction designated by arrow A in FIG. 1 is accomplished by a tilt assembly which may be connected to the heat receiver 20 and positioned on vertical support 19. In the embodiment disclosed in FIGS. 1 and 3, this tilt assembly consists of a tilt gear segment 25 attached to transverse shaft 22. (See FIG. 1). Tilt gear 25 is of generally semi-circular configuration having gear teeth radiating from its peripheral edge. Gear 25 is fixedly attached to transverse axes 22 such that when gear segment 25 is rotated about the center of shaft 22, transverse shaft 22 is also rotated thereby causing heat receiver 20 to rotate or tilt in the directions indicated by arrow A in FIG. 1.

As seen in FIG. 3, positioned adjacent the lowermost portion of segment gear 25 is tilt gear 36, gear 36 having teeth formed about its outer periphery in such a manner as to be engageable with the teeth of gear segment 25. Tilt gear 36 is attached to second reduction unit 35, substantially similar to first reduction unit 10. Second reduction unit 35 is powered by any conventional rotary power means as for example electric motor 34. Both electric motor 34 and second reduction unit 35 are fixedly mounted on assembly platform 37 which has been attached directly to support 19. Control of second reduction unit 35 is done by means of tilt timer 46 as shown in FIG. 3. Timer 46 is similar to rotary timer 45 and may be mounted on support 19 and adapted for movement in unison with reduction unit 35 or remotely mounted from boiler 1 and having flexible conductors passing through hub 14 to unit 35.

As shown in FIG. 3, a tilt alignment adjustment 17 is shown mounted on central plate 3 and adapted for allowing the operator to make manual adjustments of the position of heat receiver 20. A similar rotary alignment adjustment 18 is provided to allow manual adjustments in the rotary direction. Such manual adjustments may be necessary for initial start-up or calibration of timer 46 for a particular solar boiler and a particular location and time of year.

Operation of the solar boiler may be appreciated from an examination of FIGS. 2 and 5. During operation, the solar boiler is positioned as shown in FIG. 5 during the early morning hours such that the vertical lens supports are positioned substantially parallel with the rays of the sun 42. Such positioning allows the rays to be concentrated by lens 26 at focal points 43 in order to transfer heat in an efficient manner to the fluid passing through conduits 33. As the sun progresses along its arcuate path, tilt timer 46 causes reduction unit 35 to gradually rotate tilt power gear 36. As power gear 36 is rotated, its teeth engage the peripheral teeth of tilt gear segment 25 causing segment 25 to rotate in the direction designated by arrow B in FIG. 5. Timer 46 is adjusted such that the rotation of tilt gear 25 maintains heat receiver 20 in a substantially normal relationship to the sun's rays as the sun proceeds along its arcuate path. Also, since the sun does not typically travel in a straight line, but rather an arc, it is necessary to rotate or swivel the heat receiver by means of the rotary reduction unit and accompanying gears. This rate of rotation about a vertical axis is accomplished by gear 11 engaging foundation gear surface 8 as previously explained.

Through the regulated movement of the tilt assembly and base assembly, all the various lens 26 are able to efficiently concentrate the sun's rays at proper points on the surface of the heat plate 32.

Since it may be necessary to manually adjust the position of heat receiver 20 an adjustment site assembly has been provided. Referring to FIG. 1, the sight assembly 16 consists of a circular conduit or tube extending through heat receiver 20 and having its central axis substantially normal to the heater receiver and therefore parallel with the sun's rays when the heat receiver is properly aligned. Located at the lower portion of sight assembly tube is a shaded glass or leans 44. Since this glass insert 44 is tinted, a small shadow or darkened area is formed when the central axis of the sight tube is not substantially aligned with the rays of the sun. For example, if the rays of the sun enter the upper end of the sighting tube 16 at an angle with respect to the center line of the sight, a small circularshaped shadow will be cast upon the tinted glass insert at the lower portion of the sight assembly. Observing such a shadow, the operator then will be able to utilize the manual tilt alignment adjustment 17 and rotary alignment adjustment 18 to properly align the heat receiver with respect to the sun's rays.

It can be appreciated that in constructing a solar boiler according to the present invention, certain significant advantages are provided. In particular, a novel apparatus for converting solar energy into a heated fluid is described. In particular, a solar boiler is shown which provides simple and easily maintained means for continually maintaining the sun's rays in proper alignment with a heat receiving device.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in shape, size and arrangement of parts. For example, equivalent elements or materials may be substituted for those illustrated and described herein. Parts may be reversed, and certain features of the invention may be utilized independently of the use of other features, all as would be apparent to one skilled in the art after having the benefit of having this description of the invention.

What is claimed is:

1. A solar boiler for utilizing solar energy to heat a fluid passing through said boiler, said boiler comprising:
    a substantially planar heat receiver through which the fluid to be heated is circulated;
    a plurality of adjustable lens assemblies mounted substantially parallel and equidistant from said heat receiver, said lens assemblies mounted for movement in unison with said heat receiver for continuously focusing the rays of the sun onto said heating receiver;
    means connected to said heat receiver for controllably tilting said heat receiver about a substantially horizontal axis as the sun proceeds along its apparent path of movement;
    a base assembly connected to said tilting means, said base assembly adapted for rotating said heat receiver independent of said tilting means about a substantially vertical axis whereby the heat receiver is maintained substantially normal to the rays of the sun as the sun proceeds along its apparent path of movement; and
    a plurality of fluid conduits passing through said base assembly and connected to said heat receiver, said conduits for conducting fluid to and from said boiler.

2. A solar boiler as defined in claim 1, wherein said heat receiver includes:
    a heat conducting mass spaced from said lens assembly and upon which the rays of the sun are focused; and
    a fluid passage in heat conducting relationship to said mass through which the fluid to be heated passes.

3. A solar boiler as defined in claim 1 including a transverse shaft fixed to said heat receiver with at least one of the ends of said shaft extending outwardly from said receiver.

4. The solar boiler as defined in claim 3 wherein said tilting means includes:
    a support structure attached to said base assembly, said transverse shaft being rotatably mounted to said support structure; and
    a tilt assembly attached to said transverse shaft, said tilt assembly adapted for rotating said transverse shaft at a predetermined rate.

5. The solar boiler as claimed in claim 4 wherein said tilt assembly includes:
    (a) a tilt gear segment connected to said transverse shaft;
    (b) a tilt reduction unit mounted for movement in unison with said support structure, said reduction unit engaging said gear segment and rotating said gear segment at a predetermined rate of rotation; and
    (c) means for providing rotary power to said tilt reduction unit.

6. The solar boiler as defined in claim 1 wherein base assembly includes:
    a foundation member;
    a central portion rotatably connected to said foundation member; and means associated with said central portion for rotating at a predetermined rate of rotation said central portion with respect to said foundation member.

7. The solar boiler as recited in claim 6 wherein said rotating means includes:
   a rotary reduction unit mounted for movement in unison with said central portion;
   a foundation gear connected to said rotary reduction unit and engaging said foundation member; and
   means for providing rotary power to said rotary reduction unit.

8. The solar boiler as recited in claim 1 including a means for manually positioning the heat receiver substantially normal to the rays of the sun.

9. The solar boiler as recited in claim 8 wherein the means for manually aligning the heat receiver includes an elongated sight tube mounted to said heat receiver and substantially normal to said heat receiver; a translucent insert attached to the lower portion of said sighting tube whereby the rays of the sun create a shaded portion upon said insert if said rays are non-parallel to the central axis of said sighting tube.

* * * * *